United States Patent [19]

Uebach et al.

[11] Patent Number: 4,997,118
[45] Date of Patent: Mar. 5, 1991

[54] ROOF TRUNK

[75] Inventors: Horst Uebach, Sengenthal; Siegfried Deisenhofer, Herrieden, both of Fed. Rep. of Germany

[73] Assignee: JETBAG GmbH, Neumarkt, Fed. Rep. of Germany

[21] Appl. No.: 401,219

[22] Filed: Aug. 31, 1989

[30] Foreign Application Priority Data

Aug. 31, 1988 [DE] Fed. Rep. of Germany ....... 3829485

[51] Int. Cl.$^5$ .............................. B60R 9/04; E05C 1/12
[52] U.S. Cl. ..................................... 224/315; 224/328; 49/395; 220/323; 292/36
[58] Field of Search ...................... 224/42.2, 315, 328; 292/9, 36, 42, 156, 158, 193; 220/323, 335, 342; 49/395

[56] References Cited

U.S. PATENT DOCUMENTS

| 2,920,802 | 1/1960 | Cook | 224/328 |
| 3,138,307 | 6/1964 | Priban | 224/328 |
| 3,970,343 | 7/1976 | Horn | 292/36 X |
| 4,015,866 | 4/1977 | Marsh et al. | 292/36 |

FOREIGN PATENT DOCUMENTS

| 853371 | 12/1939 | France | 224/328 |
| 418884 | 2/1967 | France | 49/395 |
| 2422805 | 12/1979 | France | 49/395 |
| 1086269 | 10/1967 | United Kingdom | 49/395 |

Primary Examiner—Henry J. Recla
Assistant Examiner—Robert M. Fetsuga
Attorney, Agent, or Firm—Jordan and Hamburg

[57] ABSTRACT

Roof trunk for motor vehicles which has a clamshell-like lid hinged to the preferably likewise clamshell-like trunk body, which in its closed state can be latched by a plurality of latches which are disposed on a longitudinally displaceable locking rod and which can engage in stationary catches. The lid is hinged to the trunk body at one of its short sides and can be joined at both longitudinal sides to the trunk body by a plurality of spaced latches, and the locking rods are connected at both longitudinal sides to a common actuating mechanism through corner-turning devices.

12 Claims, 5 Drawing Sheets

ROOF TRUNK

BACKGROUND OF THE INVENTION

The invention relates to a roof trunk with a preferably clam-shell-like lid which is hinged to a likewise clamshell-like trunk body and which can be locked in its closed position by a plurality of latches disposed on a longitudinally displaceable locking rod and engaging stationary catches.

In conventional roof trunks of the kind described above, the hinging of the lid to the body is provided on one of the longitudinal sides that run along the roof of the vehicle parallel to the longitudinal axis of the car. The latches are disposed on the opposite longitudinal side and so, accordingly, is the lock that controls them.

This arrangement has the disadvantage, among others, that the roof trunk can be loaded only from one side.

The invention is therefore addressed to the problem of designing a roof trunk such that it will be conveniently accessible from both sides when open, while simultaneously providing great security against theft when locked.

To solve this problem, provision is made according to the invention for the lid to be hinged to the trunk body on one of its short sides and for it to be fastenable to the trunk body on both longitudinal sides by a plurality of catches disposed at intervals, and for the locking rods on the two longitudinal sides to be connected by corner-turning means to a common actuating means.

On account of the configuration in accordance with the invention, when the lid is opened the trunk body is accessible from the two longitudinal sides and the other side, so that the roof trunk can be loaded and unloaded much more easily. Likewise the multiple latching in each of the longitudinal sides provides an especially secure lock, which can still be released by a manual operation the same as in the past, due to the linking together of the two locking rods.

Although the actuating mechanism could also be disposed in one of the side walls, especially the free short side of the trunk body, as is common in the roof trunks known heretofore, a further development of the invention has proven to be especially desirable in which the actuating mechanism includes a folding handle disposed under the bottom of the trunk body in the area of the short side opposite the hinge side of the lid, the shaft of the handle passing sealingly through the bottom and bearing a rocking lever to whose extremities transverse links are articulated which are connected each by a rotatably mounted bell crank to one of the lock rods.

Through this arrangement of the handle under the bottom of the roof trunk a large, easily operated handle can be provided and the locking does not have to be performed, as in the roof trunks known heretofore, by means of the small safety key whose rotary movement results in the displacement of the lock rod. Disposing the handle on the bottom makes it more easily accessible than if it were to be disposed on the short side, and finally it also becomes advantageously possible to swing the handle away so as to be almost invisible when in the normal nonworking position because it is linked pivotingly to the shaft so that it can be swung back and forth between a working position aligned with the shaft and a lockable non-working position folded against the trunk bottom.

An especially good locking action is achieved in further development of the invention if the latches are pins engaging hooks in the lid and riveted onto the locking rods, and, to prevent damage to the articles contained in the trunk and reduce the danger of injury when loading and unloading, guards opening upward and toward the narrow sides are to be fastened at the longitudinal inner sides of hte trunk body, to accommodate the hooks on the lid as well as the pins when the trunk is closed.

Other advantages, features and details of the invention will be found in the following description of an embodiment and in the accompanying drawings.

DESCRIPTION OF THE PREFERRED EMBODIMENTS

Figure 6:
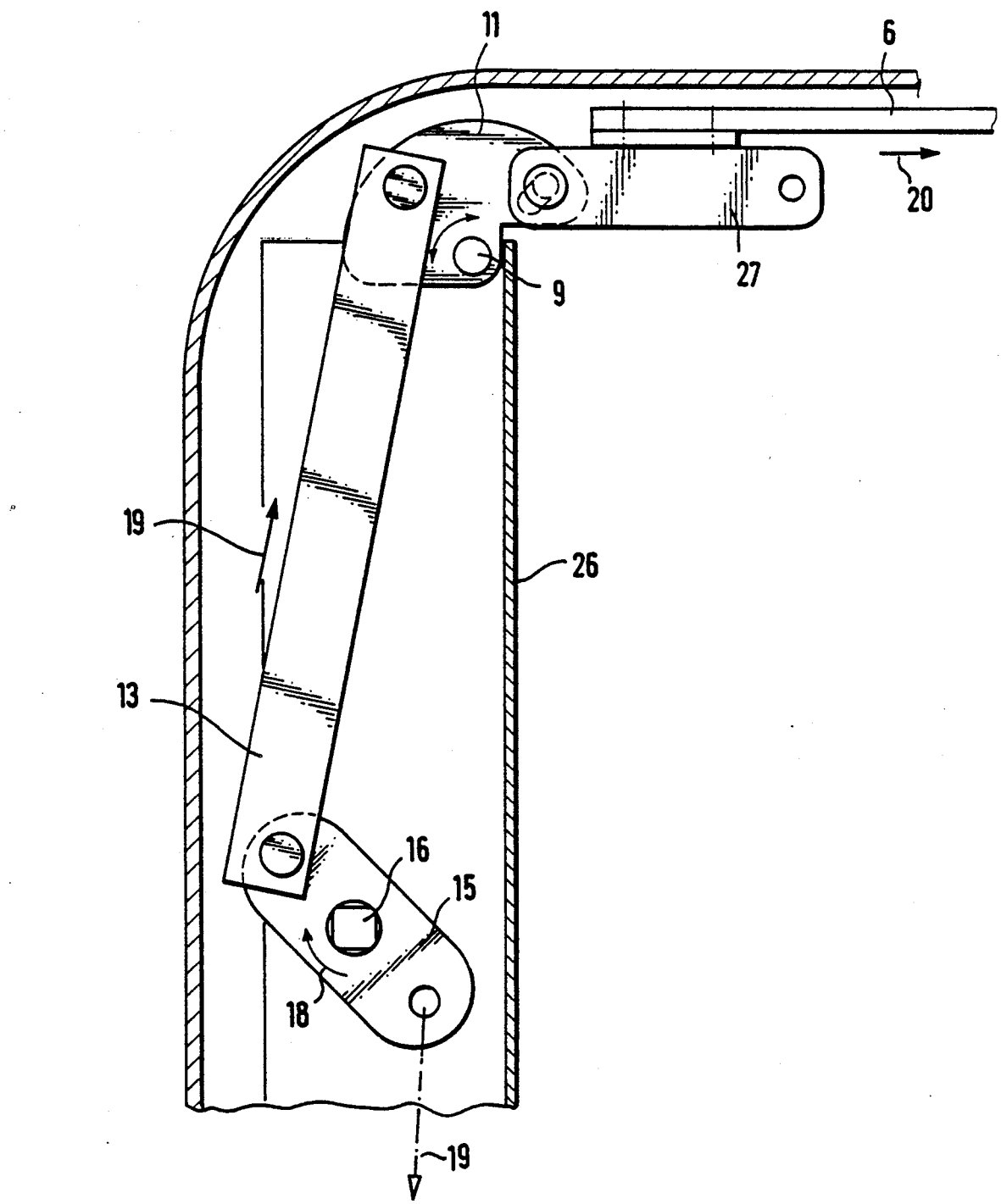
FIG. 6 is a fragmentary cross section parallel to the trunk floor in the area of the closing mechanism to explain the bell crank action.
Figure 7:
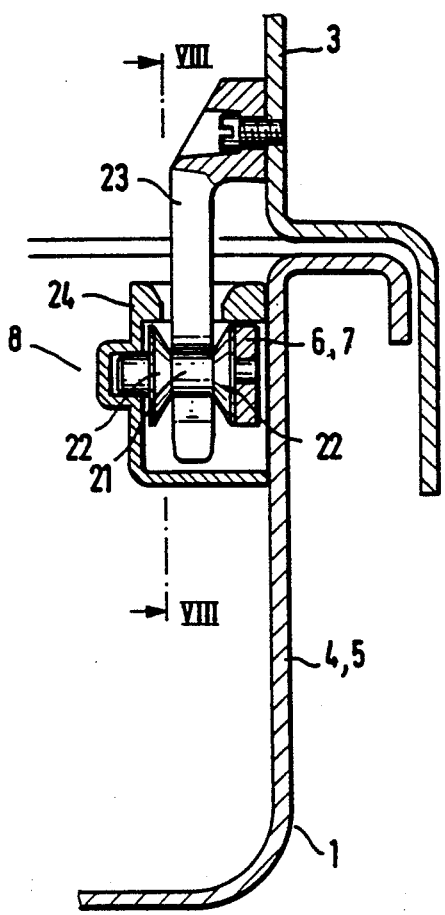
FIG. 7 is a fragmentary section through one of the longitudinal side walls of the roof trunk in the closed state, in the area of one of the six latches that are provided.
Figure 8:
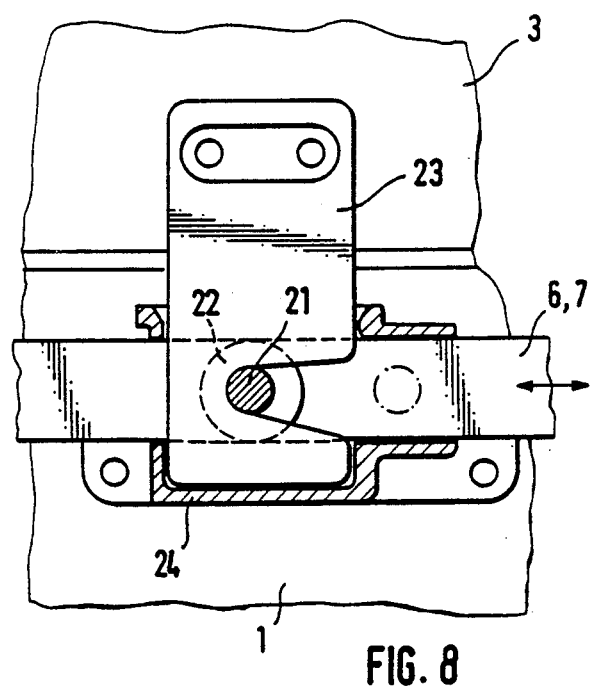
FIG. 8 is a section along the line III—III in FIG. 7 and is a cut-away view of the inside of the roof trunk in the area of a latch.
Figure 9:
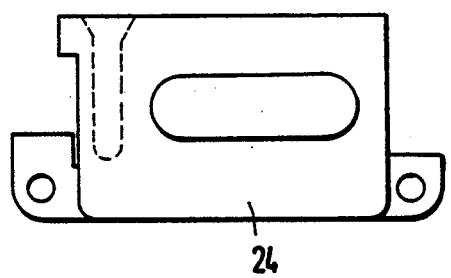
FIG. 9 is a view of the lock guard.
Figure 10:
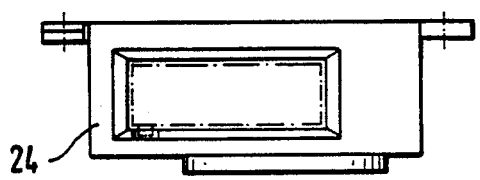
FIG. 10 is a top view of the lid in accord with FIG. 9.

The roof trunk illustrated consists of a clamshell-like trunk body 1 and a lid 3 hinged thereon along the one short side 2. The roof trunk can be fastened onto a motor vehicle in the conventional manner by means of carrier straps. These components, however, have long since been known and therefore they are not shown at all in the drawings so as not to interfere with the view. When the roof trunk is opened, the fact that the hinge is provided on the short side permits access to the trunk body from both longitudinal sides, i.e., from both sides of the motor vehicle, thus permitting an easier and quicker loading and unloading. Along both longitudinal sides 4 and 5 of the trunk body 1 locking rods 6 and 7 are disposed in order to provide a lock between the bottom and the lid at three points 8 on each side. The locking rods connected by bell cranks 11 and 12 to transverse links 13 and 14 which in turn are articulated to the ends of a flat rocking lever 15 which is connected co-rotationally to a shaft 16 which passes sealingly through the bottom of the lower part of the trunk, and can be actuated through a handle 17 which can swing in and out. When the handle 17 is pulled downward to a position parallel to the shaft 16, the handle is rotatable such that the flat lever 15 turns in the direction of the arrow 18 in FIG. 6. This causes the transverse links to shift autwardly (arrow 19 in FIG. 6), resulting in a longitudinal displacement in the same direction by the bell cranks 11 and 12, respectively, of the two locking rods 6 and 7 (arrow 20 in FIG. 6). By turning the handle in the one direction, therefore, a displacement in the same direction of the locking rods 6 and 7 can be produced for locking and by turning it in the other direction a displacement in the same direction can be produced to release the latches. The latches in the case of the embodiment shown are constituted by riveting rollers 21 with flanges 22 onto the lock rods 6 and 7, respectively; these rollers can become engaged in hooks 23 fastened to the lid 3 and laterally projecting downwardly into the trunk body 1. This path of movement can most easily be seen in FIG. 8. Guards 24, which are open over the short sides and at the top, are applied to the inside surfaces of the longitudinal sides 4 and 5 of the trunk body. When the trunk is closed, these guards are intended to accommodate both the hooks 23 and the rollers 21 engaging them.

In the same manner, a guard 26 is provided in the area of the second short side 25 for the shaft 16 and the transverse links 13 and 14 as well as the bell cranks 11 and 12. Metal brackets 27 and 28 serve to join the lock rods 6 and 7, which are flat metal rods running parallel to the longitudinal walls 4 and 5, to the flat transverse links 13 and 14 lying in a plane at 90° to that of the lock rods.

Figure 1:
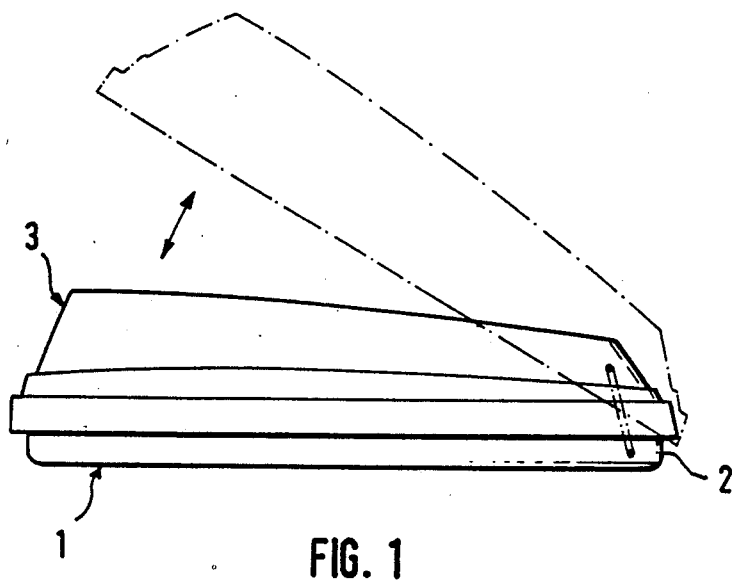
FIG. 1 is a side view of a roof trunk in accordance with the invention.
Figure 2:
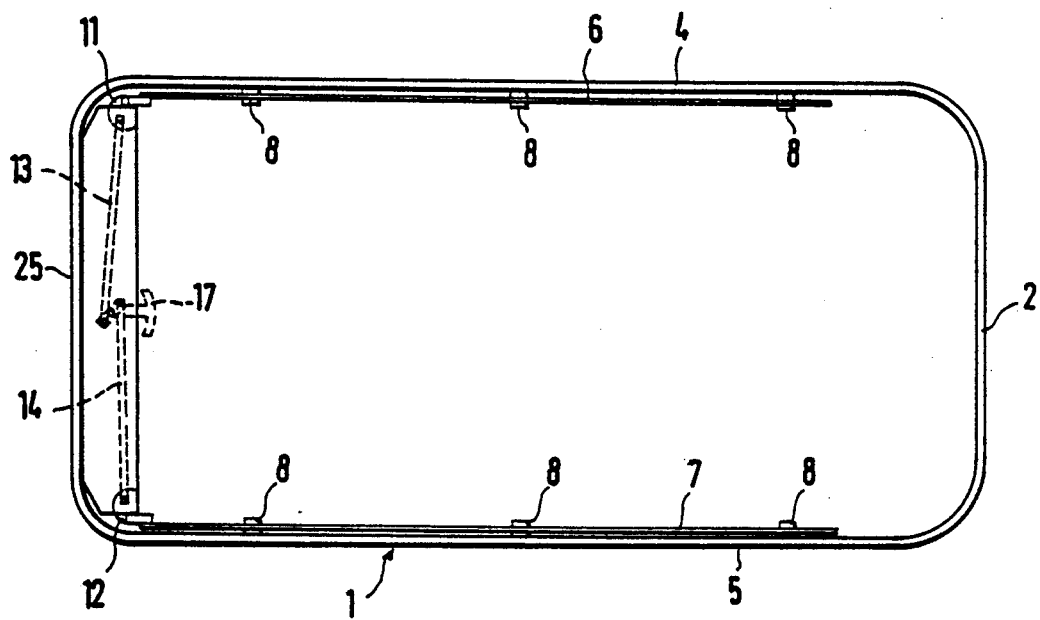
FIG. 2 is an enlarged top view of the trunk body of the roof trunk.
Figure 3:
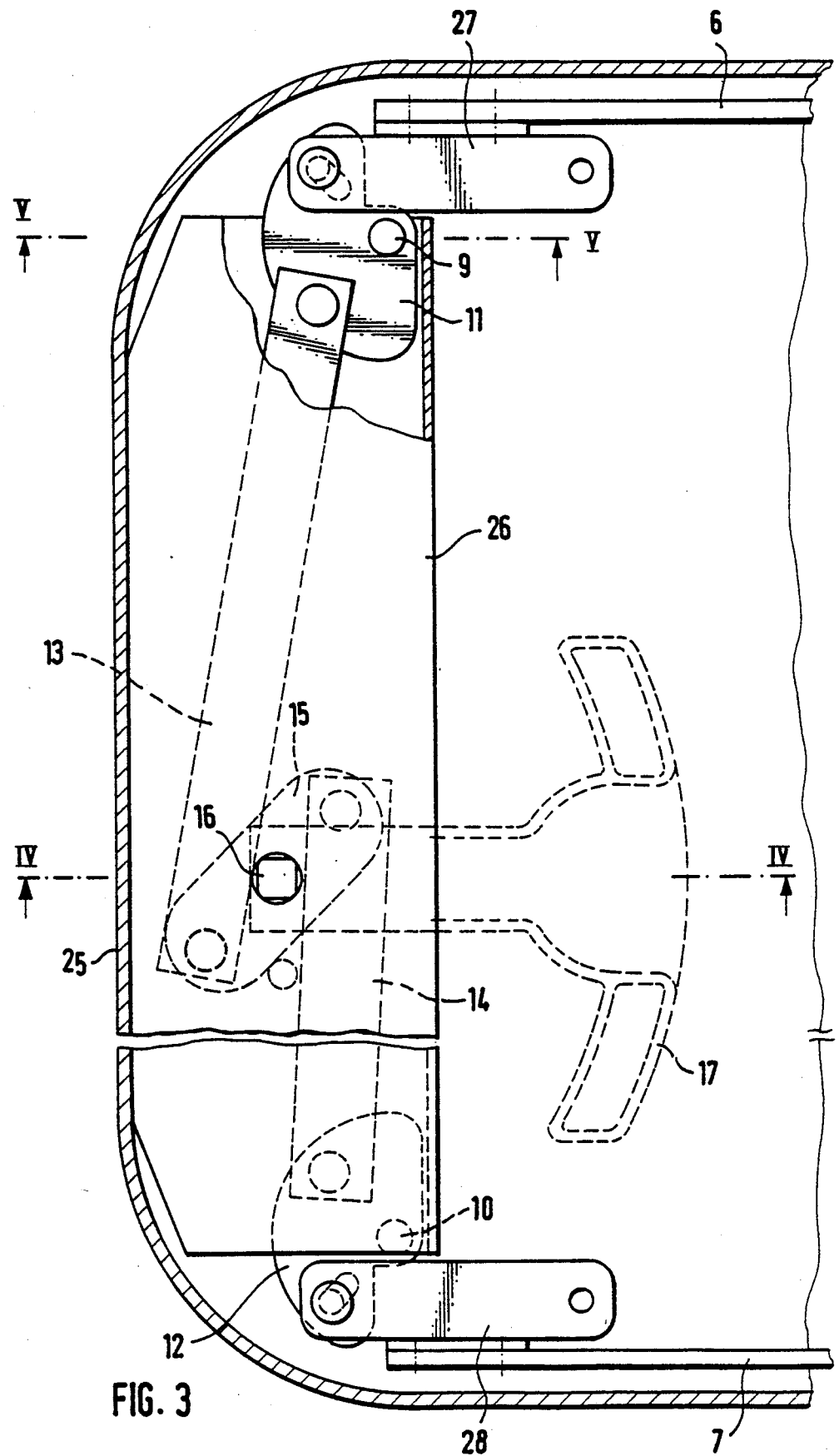
FIG. 3 is a more greatly enlarged top view of the trunk body in the area of the lock actuating means.
Figure 4:
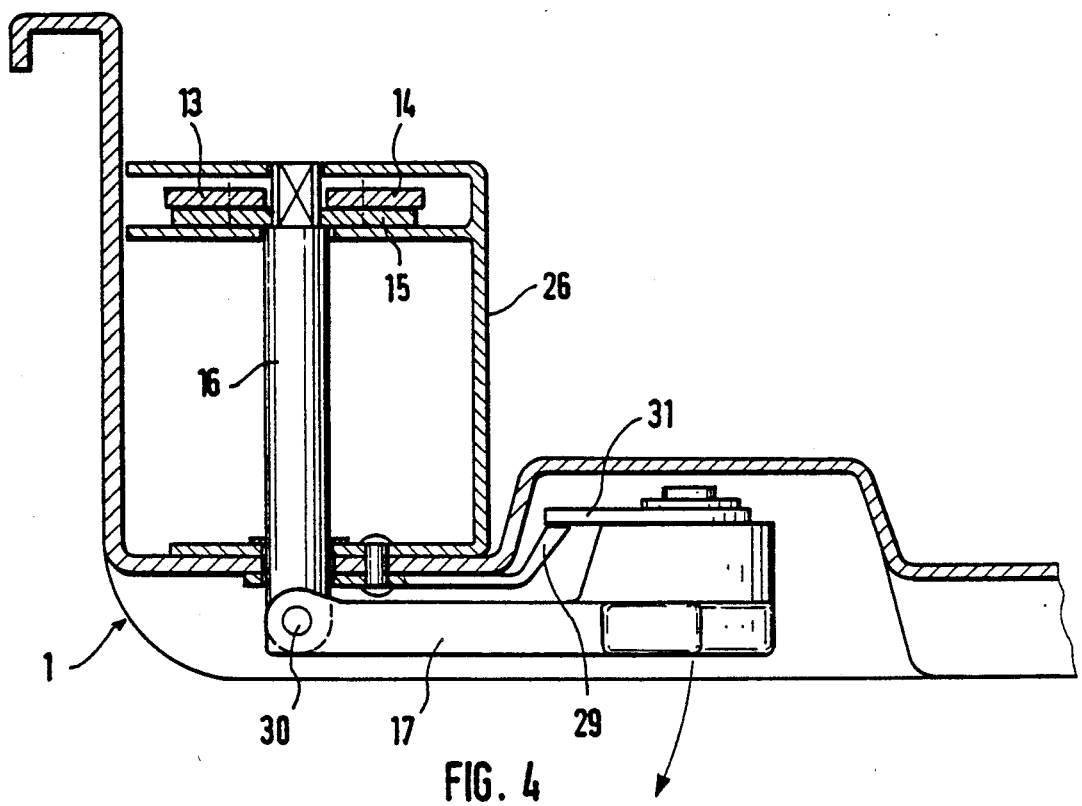
FIG. 4 is a section along line IV—IV in FIG. 3.
Figure 5:
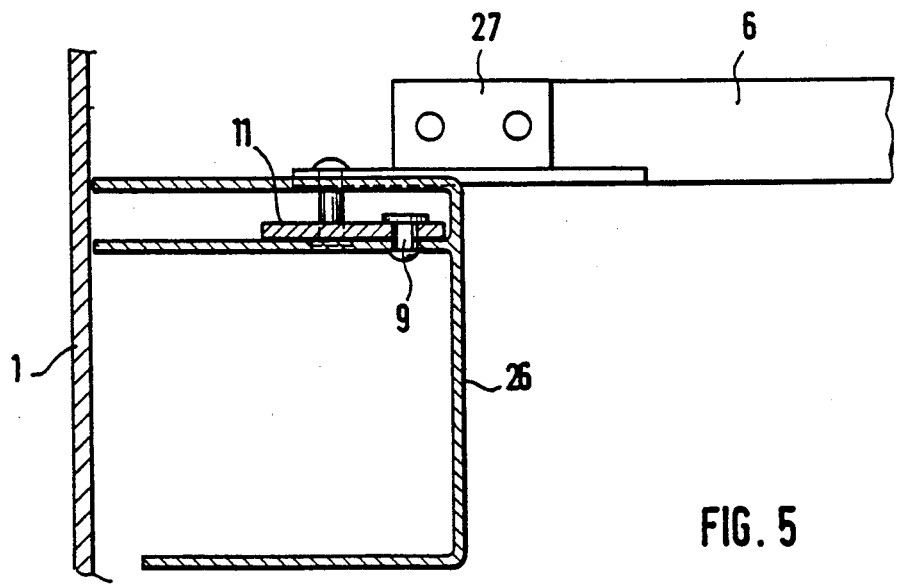
FIG. 5 is a section along line V—V in FIG. 3.

The folding handle 17 is provided, as best seen in FIG. 4, with a safety lock by means of which a latch 31 can be turned to the locked position over an abutment 29 when the folding handle 17, which is articulated to the shaft 16 on a shaft 30, is folded to the retracted, nonworking position. Thus, it is only after the security cylinder lock has been unlocked that the handle can be swung outwardly so that the shaft 16 can be rotated to open all the locks together.

What we claim is:

1. A roof trunk for a motor vehicle comprising a body member means and a lid member means with said body member means and said lid member means each having opposite sides adapted to be generally parallel to the front-to-rear axis of the motor vehicle and with the lid member means being pivotably mounted on said body member means for pivotal movement between open and closed positions about a pivotal axis generally perpendicular to said fron-to-rear axis, elongated latch means mounted on said opposite sides of one of said member means and moveable longitudinally between latched and unlatched positions, engageable latch means on the other of said member means engageably latched by said elongated latch means when said elongated latch means is in said latched position, and a latch operating means operatively connected to said elongated latch means for moving said elongated latch means between said latched and unlatched positions, each of said body member means and said lid member means having a third side generally parallel to said pivotal axis, said latch operating means comprising connecting members disposed on said third side of said one member means, said latch operating means further comprising pivotal members pivotably mounted on said one member means and connecting said connecting member to said elongated latch means, said latch operating means further comprising an actuating means mounted on said one member means and operatively connected to said connecting members such that actuation of said actuating means operates said connecting members which in turn pivot said pivotal members to thereby effect operation of said elongated latch means between said latched and unlatched positions, said actuating means comprising an actuating member pivotably connected to said connecting members and rotating means operable to rotate said actuating member about an operable axis such that rotation of said rotating means effects operation of said elongated latch means between said latched and unlatched positions.

2. A roof trunk according to claim 1, wherein said opposite sides of said body member means are joined to said third side of said body member means at opposite corners, said pivotal members being pivotably mounted on said body member means at said corners.

3. A roof trunk according to claim 1, wherein said pivotal members comprise bell crank members having first pivots pivotably connected to said connecting members and second pivots pivotably connected to said elongated latch means.

4. A roof trunk according to claim 1, wherein said rotating means comprises a shaft part connected to said actuating member and a handle part pivotably connected to said shaft part, said handle part being pivotal between an operable position and a retracted position.

5. A roof trunk according to claim 7, wherein said handle part has a grasp section adapted to be grasped and an elongated section extending from said grasp section, said elongated section having an elongate axis which is generally coextensive with the longitudinal axis of said shaft part when said handle part is in said operable position.

6. A roof trunk according to claim 5, wherein said elongate axis is generally perpendicular to said longitudinal axis of said shaft part when said handle part is in said retracted position.

7. A roof trunk according to claim 4 further comprising locking means on said body member means for retaining said handle part in said retracted position.

8. A roof trunk according to claim 14, wherein each of said member means has longitudinal sides adapted to be parallel to said front-to-rear axis of the motor vehicle, said engageable latch means comprising a plurality of spaced latches disposed along each longitudinal side of said other member means, said elongated latch means comprising elongated latching rods having spaced latch parts which are engageable with said spaced latches when said elongated latch means is in said latched position and which is disengageable from said spaced latches when said elongated latch means is in said unlatched position, said rotating means comprising a handle which is operable by a person's one hand to thereby simultaneously move said elongated locking rods to effect simultaneous engagement and disengagement between said elongated latching rods and said plurality of spaced latch parts.

9. A roof trunk for a motor vehicle comprising a body member means and a lid member means with said body member means and said lid member means each having opposite sides adapted to be generally parallel to the front-to-rear axis of the motor vehicle and with the lid member means being pivotably mounted on said body member means for pivotal movement between open and closed positions about a pivotal axis generally perpendicular to said front-to-rear axis, elongated latch means mounted on said opposite sides of one of said member means and moveable longitudinally between latched and unlatched positions, engageable latch means on the other of said member means engageable latched by said elongated latch means when said elongated latch means is in said latched position, and a latch operating means operatively connected to said elongated latch means for moving said elongated latch means between said latched and unlatched positions, said elongated latch means comprising an elongated member and roller means rotatably mounted on said elongated member, said engageable latch means having a receiving section which receives and engages said roller means when said elongated latch means is in said latched position.

10. A roof trunk according to claim 9, wherein said receiving section has converging sides.

11. A roof trunk according to claim 9 further comprising guard means mounted on said body member means for receiving said roller means and said engageable latch means when said elongated latch means is in said latched position.

12. A roof trunk for a motor vehicle comprising a body member means and a lid member means with said body member means and said lid member means each having opposite sides adapted to be generally parallel to the front-to-rear axis of the motor vehicle and with the lid member means being pivotably mounted on said body member means for pivotal movement between open and closed positions about a pivotal axis generally perpendicular to said front-to-rear axis, elongated latch means mounted on said opposite sides of said body member means and moveable longitudinally between latched and unlatched positions, engageable latch means on said lid member means engageably latched by said elongated latch means when said elongated latch means is in said latched position, and a latch operating means operatively connected to said elongated latch means for moving said elongated latch means between said latched and unlatched positions, each of said body member means and said lid member means having a third side generally parallel to said pivotal axis, said latch operating means comprising connecting members disposed on said third side of said body member means, said latch operating means further comprising pivotal members pivotably mounted on said body member means and connecting said connecting members to said elongated latch means, said latch operating means further comprising an actuating means mounted on said body member means and operatively connected to said connecting members such that actuation of said actuating means operates said connecting members which in turn pivot said pivotal members to thereby effect operation of said elongated latch means between said latched and unlatched positions.

* * * * *